Figure 1:
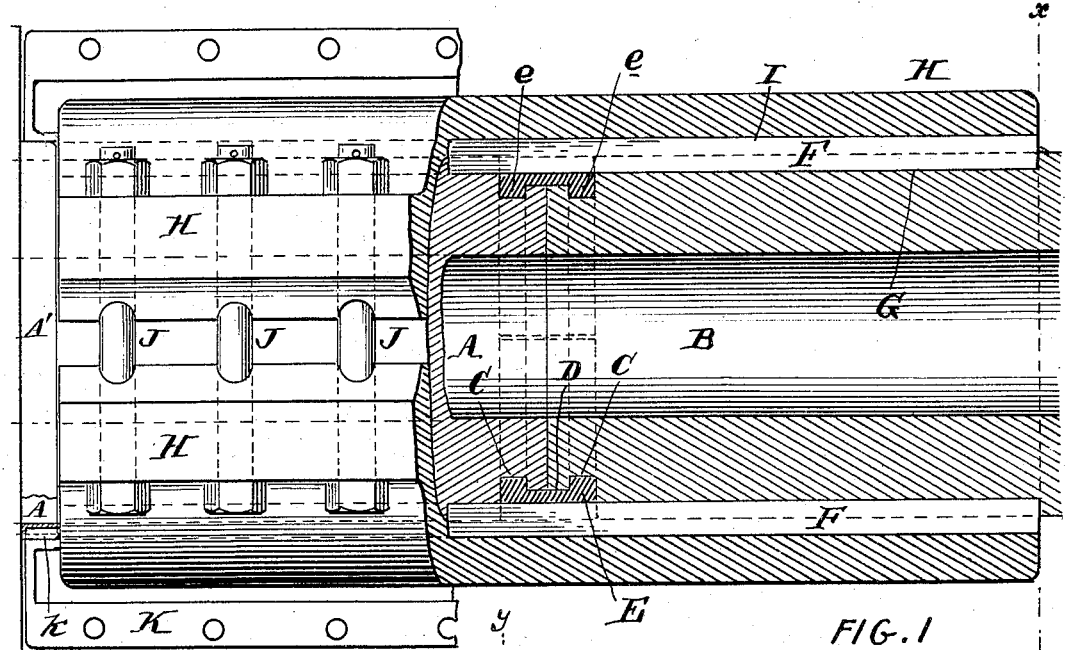

No. 789,223. PATENTED MAY 9, 1905.
L. D. LOVEKIN.
SHAFT COUPLING.
APPLICATION FILED NOV. 18, 1904.

Attest
C. M. Kelly
M. J. Eyre

Inventor
Luther D. Lovekin
By his atty

No. 789,223.

Patented May 9, 1905.

UNITED STATES PATENT OFFICE.

LUTHER D. LOVEKIN, OF PHILADELPHIA, PENNSYLVANIA.

SHAFT-COUPLING.

SPECIFICATION forming part of Letters Patent No. 789,223, dated May 9, 1905.

Application filed November 18, 1904. Serial No. 233,312.

*To all whom it may concern:*

Be it known that I, LUTHER D. LOVEKIN, of the city and county of Philadelphia and State of Pennsylvania, have invented an Improvement in Shaft-Couplings, of which the following is a specification.

My invention has reference to shaft-couplings; and it consists of certain improvements which are fully set forth in the following specification and shown in the accompanying drawings, which form a part thereof.

The object of my invention is to provide a suitable construction of coupling adapted more particularly for "outboard" uses in propeller-shafts for connecting the propeller-shaft proper with the line-shaft which extends into the vessel.

More specifically, the object is to provide a very simple construction obviating the use of tapered ends of the shafts and to otherwise form the parts so that the boring is straight and parallel, the keyways planed straight, and all the machine workings of an inexpensive and simple character.

By my improved construction herein set out the keys for connecting the shafts and coupling-clamps can be fitted accurately in place, so as to obtain proper distribution of the load. The coupling may be assembled in pieces of convenient size and in such a manner that there is no uncertainty as to fit. The tail of the propeller-shaft, which is of great weight, does not have to be moved in the process of fitting the coupling and keys, as the ends of the shafts may be brought together in proper alinement and all fittings clamped down without further movement of the shaft. The portion of the shafts which are reduced for receiving the thrust-rings are not subjected to any stress, either of torsion or bending. Holes cut through the shaft, such as required for cotters in the sleeve type of coupling, are obviated, and all uncertainty due to the use of such cotters in drawing the shafts together is eliminated. The coupling is easily removed and replaced when necessary in ordinary service, as in uncoupling the shaft need not be removed, and the parts of the coupling are made of convenient size for handling. Corrosion of the interior surfaces of the shaft cannot prevent the removal of the coupling. A lighter coupling of a given strength is secured than by the sleeve type, and the structure is such that the stresses can be properly distributed by the accurate fitting which is possible in the general design.

In carrying out my invention I provide the two shafts at their abutting ends with circumferential grooves and flanges of smaller diameter than the diameter of the shafts and combine therewith a split thrust-ring of channel shape in cross-section fitting the grooves of the said shafts for holding them together and receiving the end thrust in going astern, clamps inclosing the said ends of the shafts and thrust-ring, and one or more keys fitting both clamps and shafts and preferably extending across the thrust-ring, whereby the power is transmitted through said keys and clamps from one shaft to the other and thrust-ring held in definite position to prevent the shafts being pulled apart.

My invention comprehends details of construction which, together with the above features, will be better understood by reference to the drawings, in which—

Figure 2:
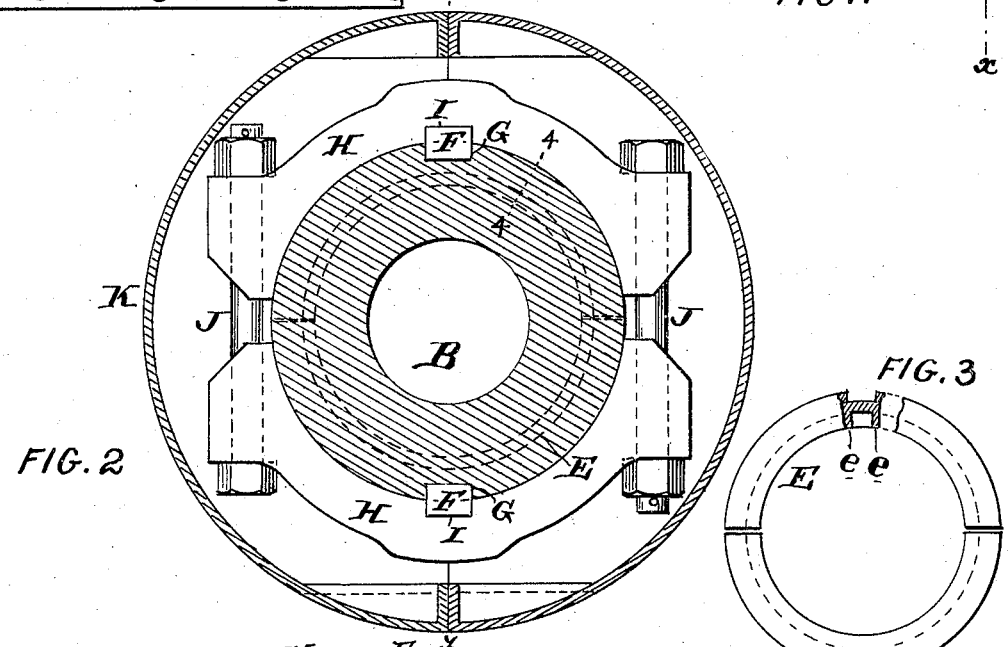
Figure 3:
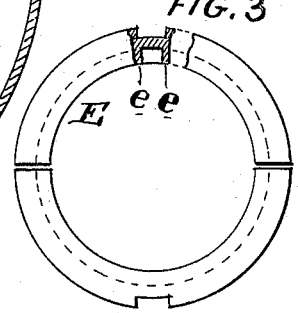
Figure 4:
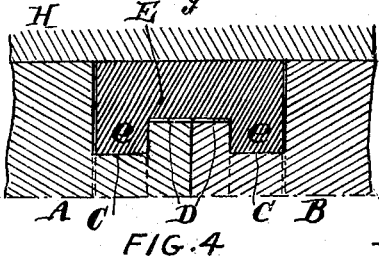

Figure 1 is an elevation of a shaft-coupling, with part in section, embodying my invention. Fig. 2 is a cross-section of same on line $x\ x$ of Fig. 1. Fig. 3 is an elevation of the divided thrust-ring, and Fig. 4 is an enlarged view of a portion of Fig. 1.

A and B are the two abutting shafts, which in this case respectively represent the line-shaft extending to within the vessel and the propeller-shaft located wholly outside of the vessel. These two shafts have their adjacent ends reduced in diameter, as at D, and circumferentially grooved, as at C, thereby forming flanges at the parts D. Fitting into the grooves C and over the flanges D, I arrange the thrust-ring E, which is split and channel-shaped in cross-section, as shown in Figs. 1 and 3. This ring E has the inwardly-extending flanges $e\ e$, which fit into the grooves C C of the shafts and lock them together, so that they cannot be pulled apart when the vessel is going astern. The groove of the body of this ring fits over the flanges D and is preferably of the same external diameter as the shafts A and B and grooved so as to extend under the keys E and permit them to be continuous. This thrust-ring is only required to resist the tendency of the shafts to separate when the vessel is going astern, and this is very slight, first, because the speed is slow, and, secondly, the clamps of the couplings are almost sufficient to take this strain alone.

H H are two clamping parts, which extend partly over the ends of each of the shafts and almost encircles them. These clamps are bolted together by the bolts J. Keys F F connect each of these clamps H H with the shafts A and B, and said keys extend the whole length of the coupling. They fit into longitudinal grooves G on the shafts and I on the inner faces of the clamps H H. While I have shown these keys of the full length of the coupling, it is evident that they need not be so; but it is preferable to so proportion the parts that the length of the coupling is no longer than the length required to the keys to transmit the power necessary. The metal in the clamps H is so proportioned that the strains transmitted from one shaft to them will be conveyed to the other shaft without danger of rupturing said clamps. Where the keys are continuous they also transmit a part of the strain. The shafts A and B are shown as tubular; but that is not necessary. It is usual to make them tubular where large diameter is desired combined with lightness, as is the case with large vessels, because the torsional resistance is much greater in a tubular shaft than in a solid shaft of the same weight.

I have shown the employment of two keys F; but it is to be understood that I do not confine myself to any specific number of keys, as my invention would include a structure employing one or more keys, as desired.

Fig. 4 shows more clearly the surfaces of the thrust-ring, which require close fitting with the shafts, and from it will be seen that the essential feature is to have the ring fit down snugly into the bottom of the grooves C C and tightly against the flanges D D of the shafts. The double lines in this figure show where loose fitting may be permitted.

The entire coupling may be inclosed in a case K, made in sections, and fitted over it, so as to improve the appearance and form a smooth surface to revolve in the water. This case may be made in any way desired. This case K is fitted over the end of a brass sleeve A' on the shaft A, where it extends through the stern-post of the vessel, and is keyed to said brass sleeve by a key k, by which it is caused to revolve with the shaft and its sleeve, the said sleeve A' being secured to and rotating with said shaft A.

While I prefer the construction shown, the details may be modified without departing from the spirit of the invention.

Having now described my invention, what I claim as new, and desire to secure by Letters Patent, is—

1. In a shaft-coupling, the combination of two shafts having their ends formed with grooves and flanges, a split thrust-ring made channel shape in cross-section and fitting into the grooves and over the flanges, one or more continuous keys extending partly over both shafts, two clamps inclosing the ends of both shafts and adapted to receive the keys, and clamping-bolts for clamping the clamps upon the shafts.

2. In a shaft-coupling, the combination of two shafts having their ends formed with grooves and flanges, a split thrust-ring made channel shape in cross-section and fitting into the grooves and over the flanges, one or more continuous keys extending partly over both shafts and over the thrust-ring, two clamps inclosing the ends of both shafts and adapted to receive the keys, and clamping-bolts for clamping the clamps upon the shafts.

3. In a shaft-coupling, the combination of two shafts having their ends formed with grooves and flanges, a split thrust-ring made channel shape in cross-section and fitting into the grooves and over the flanges, one or more continuous keys extending partly over both shafts, two clamps inclosing the ends of both shafts and adapted to receive the keys, clamping-bolts for clamping the clamps upon the shafts, and an inclosing case having a smooth exterior inclosing the clamps and bolts.

4. In a shaft-coupling, the combination of two shafts abutting and having their ends formed with grooves and flanges, a thrust-ring formed in sections and fitting the grooves and over the flanges, two clamps fitting over the ends of both shafts, means for clamping the clamps tightly upon the shafts, and keys connecting the clamps with each of the shafts.

5. In a shaft-coupling, the combination of two shafts abutting and having their ends formed with grooves and flanges, a thrust-ring formed in sections and fitting the grooves and over the flanges, two clamps fitting over the ends of both shafts, means for clamping the clamps tightly upon the shafts, and keys connecting the clamps with each of the shafts and extending continuously over the thrust-ring.

In testimony of which invention I hereunto set my hand.

LUTHER D. LOVEKIN.

Witnesses:
R. M. HUNTER,
R. M. KELLY.